(12) United States Patent
Nanba et al.

(10) Patent No.: US 11,150,156 B2
(45) Date of Patent: Oct. 19, 2021

(54) DEVICE FOR DETECTING REFRIGERANT LEAK IN REFRIGERATION CYCLE

(71) Applicant: NANBA CO., LTD., Nagaoka (JP)

(72) Inventors: Shunsuke Nanba, Nagaoka (JP); Syoichi Nanba, Nagaoka (JP)

(73) Assignee: NANBA CO., LTD., Nagaoka (JP)

( * ) Notice: Subject to any disclaimer, the term of this patent is extended or adjusted under 35 U.S.C. 154(b) by 0 days.

(21) Appl. No.: 15/748,715

(22) PCT Filed: Feb. 15, 2016

(86) PCT No.: PCT/JP2016/054305
§ 371 (c)(1),
(2) Date: Jan. 30, 2018

(87) PCT Pub. No.: WO2017/081872
PCT Pub. Date: May 18, 2017

(65) Prior Publication Data
US 2019/0011325 A1    Jan. 10, 2019

(30) Foreign Application Priority Data

Nov. 11, 2015  (JP) .............................. JP2015-221463

(51) Int. Cl.
*F25B 49/02* (2006.01)
*G01M 3/24* (2006.01)
(Continued)

(52) U.S. Cl.
CPC ............. *G01M 3/24* (2013.01); *F25B 49/005* (2013.01); *F25B 49/02* (2013.01);
(Continued)

(58) Field of Classification Search
CPC .................. G01M 3/24; G01F 23/2965; F25B 2500/222; F25B 2700/00; G08B 23/00; G01N 29/032
See application file for complete search history.

(56) References Cited

U.S. PATENT DOCUMENTS

| 2006/0079815 A1* | 4/2006 | Sato | ........................ G01F 1/663 601/2 |
| 2012/0167668 A1* | 7/2012 | Rohr | ........................ G01M 3/24 73/40.5 A |
| 2013/0021159 A1* | 1/2013 | Timm | .................... G01M 3/243 340/605 |

FOREIGN PATENT DOCUMENTS

| CN | 1034433 A | 8/1989 |
| CN | 204373863 U | 6/2015 |

(Continued)

OTHER PUBLICATIONS

Written Opinion of the International Searching Authority of PCT/JP2016/054305 dated Mar. 29, 2016.
(Continued)

*Primary Examiner* — Elizabeth J Martin
*Assistant Examiner* — Nael N Babaa
(74) *Attorney, Agent, or Firm* — Sughrue Mion, PLLC

(57) ABSTRACT

The purpose of the present invention is to propose a device for detecting refrigerant leaks in a refrigeration cycle. The device can be applied irrespective of whether a liquid-receiving tank is present, has a simple configuration, and can be installed easily and inexpensively as a retrofit. Moreover, the device is configured so as to detect the presence of leaks without stopping operation of the equipment, and is innovative and of exceptional utility such that there is no decrease in the equipment operation rate as caused by detection of leaks. Provided is a device for detecting refrigerant leaks in a refrigeration cycle, the device comprising an (Continued)

ultrasonic wave transmitter 1 for transmitting ultrasonic waves having a prescribed frequency, an ultrasonic wave receiver 2 for receiving the ultrasonic waves transmitted by the ultrasonic wave transmitter 1, an ultrasonic wave reception determination unit 3 for determining whether the ultrasonic wave receiver 2 has received the ultrasonic waves transmitted by the ultrasonic wave transmitter 1, and a leak reporting unit 4 for externally reporting a leak event when the ultrasonic wave reception determination unit 3 has determined that the ultrasonic wave receiver 2 has not received the ultrasonic waves transmitted by the ultrasonic wave transmitter 1.

1 Claim, 2 Drawing Sheets

(51) Int. Cl.
*G01N 29/032* (2006.01)
*G01M 3/04* (2006.01)
*F25B 49/00* (2006.01)
*G01F 23/296* (2006.01)
*G08B 23/00* (2006.01)

(52) U.S. Cl.
CPC .......... *G01F 23/2965* (2013.01); *G01M 3/04* (2013.01); *G01N 29/032* (2013.01); *G08B 23/00* (2013.01); *F25B 2500/222* (2013.01); *F25B 2700/00* (2013.01)

(56) References Cited

FOREIGN PATENT DOCUMENTS

| JP | 04-052472 | A | | 2/1992 | |
|----|-----------|---|---|--------|---|
| JP | 06-241528 | A | | 8/1994 | |
| JP | 10-103820 | A | | 4/1998 | |
| JP | 11-230648 | A | | 8/1999 | |
| JP | 11230648 | A | * | 8/1999 | ............ F25B 49/005 |
| JP | 2000-130897 | A | | 5/2000 | |
| JP | 2000-320937 | A | | 11/2000 | |
| JP | 2000320937 | A | * | 11/2000 | |
| JP | 2001-099070 | A | | 4/2001 | |
| JP | 2003-014703 | A | | 1/2003 | |
| JP | 2003-042631 | A | | 2/2003 | |
| JP | 2004-125393 | A | | 4/2004 | |
| JP | 2005-041252 | A | | 2/2005 | |
| JP | 2005-241089 | A | | 9/2005 | |
| JP | 2007-322139 | A | | 12/2007 | |
| JP | 2009-024923 | A | | 2/2009 | |

OTHER PUBLICATIONS

International Search Report of PCT/JP2016/054305 dated Mar. 29, 2016.
International Preliminary Examination Report of PCT/JP2016/054305 dated May 12, 2017.
Extended European Search Report dated Apr. 18, 2019 in European Application No. 16863836.9.
Office Action dated Jul. 30, 2019 in Chinese Application No. 201680044357.7.
Search Report dated Apr. 26, 2019 in Taiwanese Application No. 105108271.

* cited by examiner

FIG. 2
(DURING HEATING)
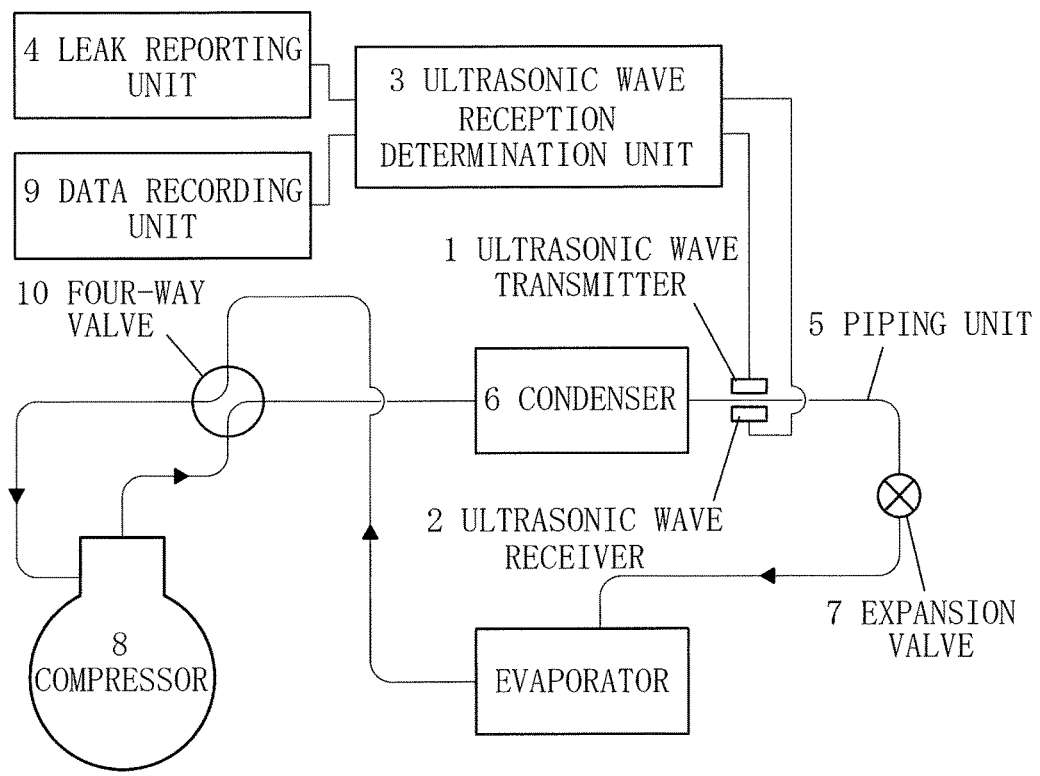
(DURING COOLING)
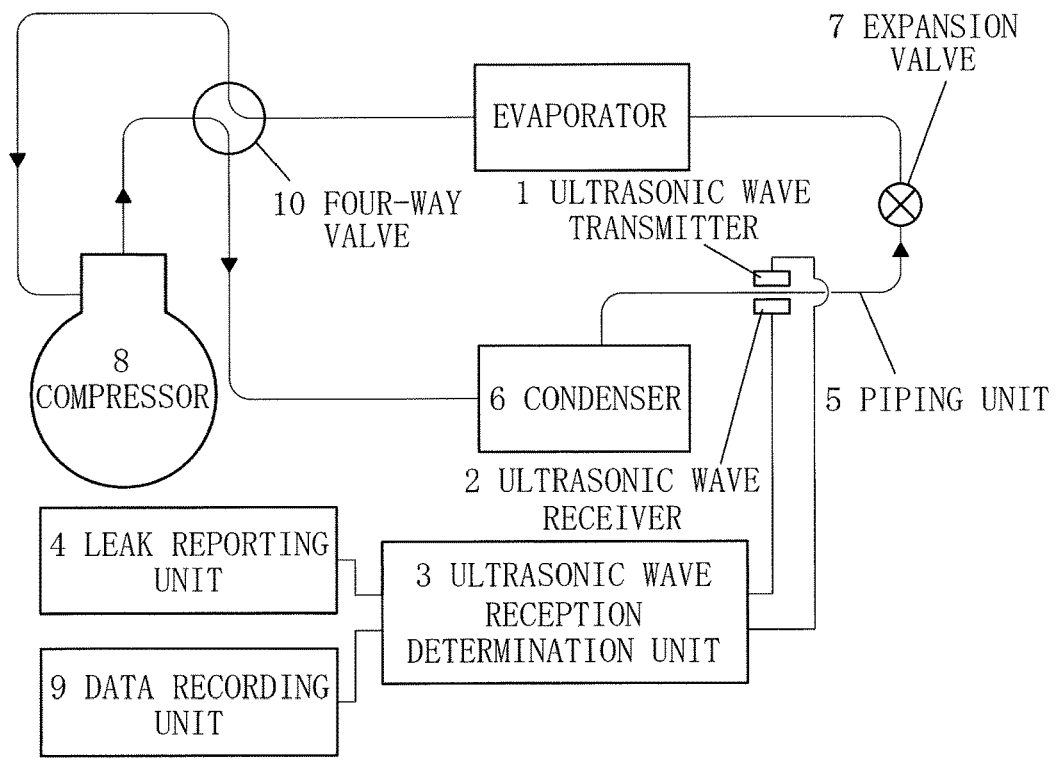

DEVICE FOR DETECTING REFRIGERANT LEAK IN REFRIGERATION CYCLE

CROSS REFERENCE TO RELATED APPLICATIONS

This is a National Stage of International Application No. PCT/JP2016/054305 filed Feb. 15, 2016, claiming priority based on Japanese Patent Application No. 2015-221463 filed Nov. 11, 2015, the contents of all of which are incorporated herein by reference in their entirety.

TECHNICAL FIELD

The present invention relates to a device for detecting a refrigerant leak in a refrigeration cycle, the device detecting the presence of a leak of refrigerant that is circulated through a refrigeration cycle in a refrigeration device or air conditioning device.

BACKGROUND ART

In the prior art, a device for detecting a leak (referred to below as a "conventional example") through management of the level of a liquid surface in which there is used a float such as is shown in patent document 1 is provided as a device for detecting a leak in a refrigeration cycle used in refrigeration equipment, etc.

In this conventional example, a float provided with a magnet that rises and falls in accordance with the level of a liquid surface and a guide provided on the inner side of the float with a reed switch that guides the float are provided within a liquid-receiving tank or within auxiliary tanks disposed in a row arrangement with respect to the liquid-receiving tank in a state of communication therewith, whereby it is detected whether the level of the liquid surface is within a preset normal liquid-surface level range, and a refrigerant leak is promptly detected.

PRIOR ART DOCUMENTS

Patent Documents

[Patent Document 1] JP-A 10-103820

DISCLOSURE OF THE INVENTION

Problem to be Solved

However, in the conventional example, when the presence of a leak is being confirmed, all of the refrigerant circulating through the refrigeration cycle must be recovered within the liquid-receiving tank by pumping down; therefore, it is necessary to stop the operation of the equipment.

Accordingly, a problem is presented in that raising the frequency of leak confirmation reduces the operation rate of the equipment. An additional problem is presented in that when operation of the equipment is prioritized, prompt discovery of leaks becomes more difficult.

In addition, when the presence of a leak is detected by the level of a liquid surface as in the conventional example, problems are presented in that, inter alia, disposing the auxiliary tanks in a row arrangement, providing a float provided with a magnet that rises and falls in accordance with the level of the liquid surface within the auxiliary tanks, and additionally providing a reed switch for detecting the position of the float within the auxiliary tanks, as described above, complicates the device configuration, makes it impossible to easily install the device, creates additional costs, and furthermore makes management of the device as a retrofit difficult because the refrigerant liquid level is typically set as a management reference value at initial installation when no leaks have occurred.

Furthermore, in the conventional example, the presence of leaks is detected through fluctuations in the liquid surface of refrigerant within the liquid-receiving tank, as described above; therefore, the conventional example cannot be applied to refrigeration cycles having no liquid-receiving tank.

The present invention was contrived in view of the current state of such devices for detecting refrigerant leaks in refrigeration cycles, it being an object of the present invention to propose a device for detecting a refrigerant leak in a refrigeration cycle that is innovative and of exceptional utility such that there is no decrease in the equipment operation rate as caused by detection of leaks. The device can be applied irrespective of whether a liquid-receiving tank is present, has a simple configuration, and can be installed easily and inexpensively as a retrofit. Moreover, the device is configured so as to detect the presence of leaks without stopping operation of the equipment.

Means for Solving the Problem

The main points of the present invention are described below with reference to the attached drawings.

The present invention relates to a device for detecting a refrigerant leak in a refrigeration cycle, the device detecting the presence of a leak of refrigerant that is circulated through a refrigeration cycle in a refrigeration device or air conditioning device, wherein the device for detecting a refrigerant leak in a refrigeration cycle is characterized by: comprising: an ultrasonic wave transmitter 1 for transmitting ultrasonic waves having a frequency which is 3 MHz or less and at which propagation is blocked by the presence of bubbles, the ultrasonic wave transmitter being provided to the outer surface of a piping unit 5 by which a condenser 6 and an expansion valve 7 in the refrigeration cycle are connected and moreover being provided at a position downstream from the condenser 6 and upstream from the expansion valve 7; an ultrasonic wave receiver 2 for receiving the ultrasonic waves transmitted by the ultrasonic wave transmitter 1, the ultrasonic wave receiver 2 being provided to the piping unit 5 in a state of mutual opposition with the ultrasonic wave transmitter 1; an ultrasonic wave reception determination unit (controller) 3 for receiving a signal from the ultrasonic wave transmitter 1 indicating that ultrasonic waves have been transmitted and receiving a signal from the ultrasonic wave receiver 2 indicating that the ultrasonic waves transmitted by the ultrasonic wave transmitter 1 have been received, determining that transmission and reception of ultrasonic waves between the ultrasonic wave transmitter 1 and the ultrasonic wave receiver 2 are not being carried out normally if no signal can be received from the ultrasonic wave receiver 2 to indicate that the ultrasonic waves transmitted by the ultrasonic wave transmitter 1 have been received irrespective of whether a signal has been received from the ultrasonic wave transmitter 1 indicating that ultrasonic waves have been transmitted, and outputting a signal; and a leak reporting unit 4 (controller) for receiving a signal outputted by the ultrasonic wave reception determination unit 3 when the ultrasonic wave reception determination unit 3 has determined that transmission and reception of ultrasonic waves between the ultrasonic wave transmitter 1 and the ultrasonic wave receiver 2 are not being carried out normally, and externally reporting a leak event; the device for detecting a refrigerant leak in a refrigeration cycle being configured such that in a state in which the refrigerant is circulated within the refrigeration cycle, the ultrasonic wave reception determination unit 3 outputs a signal to the leak reporting unit 4 when a state arises in which propagation of the ultrasonic waves transmitted by the ultrasonic wave transmitter 1 to the ultrasonic waves receiver 2 is blocked due to bubbles generated by a leak passing between the ultrasonic wave transmitter 1 and the ultrasonic wave receiver 2, and when a state arises in which no signal can be received from the ultrasonic wave receiver 2 to indicate that the ultrasonic waves transmitted by the ultrasonic wave transmitter 1 have been received irrespective of whether a signal has been received from the ultrasonic wave transmitter 1 indicating that ultrasonic waves have been transmitted, and the leak reporting unit 4 externally reports a leak event.

In addition, the present invention relates to the device for detecting a refrigerant leak in a refrigeration cycle according to the first aspect, further characterized by being configured such that in cases where a compressor 8 in the refrigeration cycle is an inverter-controlled-type compressor, in a state in which the refrigeration device or air conditioning device has been continuously operating for at least a prescribed period of time, when the ultrasonic wave transmitter 1 has continued transmitting the ultrasonic waves within the prescribed period of time and the ultrasonic wave receiver 2 has not received within the prescribed period of time any ultrasonic waves transmitted by the ultrasonic wave transmitter 1, the ultrasonic wave reception determination unit determines 3 that the ultrasonic wave receiver 2 has not received the ultrasonic waves transmitted by the ultrasonic wave transmitter 1 and the leak reporting unit 4 externally reports a leak event.

In addition, the present invention relates to the device for detecting a refrigerant leak in a refrigeration cycle according to the first aspect, further characterized by being provided with a data recording unit 9 for automatically storing data outputted from the ultrasonic wave reception determination unit 3 or the leak reporting unit 4.

In addition, the present invention relates to the device for detecting a refrigerant leak in a refrigeration cycle according to the fifth aspect, further characterized by being provided with a data recording unit 9 for automatically storing data outputted from the ultrasonic wave reception determination unit 3 or the leak reporting unit 4.

In addition, the present invention relates to the device for detecting a refrigerant leak in a refrigeration cycle according to any one of the first, fifth, sixth, and seventh aspects, further characterized by being configured such that a bubble separation device is provided at a position in the refrigeration cycle downstream from a condenser 6 and upstream from the ultrasonic wave receiver 2.

Effect of the Invention

Due to being configured as described above, the present invention can be applied (can be attached) irrespective of whether a liquid-receiving tank or auxiliary tanks that communicate with the liquid-receiving tank are present, and enables detection of refrigerant leaks in a refrigeration cycle.

The present invention is, additionally, a device for detecting a refrigerant leak in a refrigeration cycle, the device having a simple configuration, being capable of being installed easily and inexpensively, and having exceptional utility such that the device can be easily installed even on preexisting equipment.

The present invention is, additionally, a device for detecting a refrigerant leak in a refrigeration cycle that is innovative and of exceptional utility such that there is no decrease in the equipment operation rate as caused by detection of leaks because the presence of leaks is detected when the equipment is in operation.

Specifically, according to the present invention, the presence of leaks is not determined by pumping down the refrigeration cycle, briefly recovering the refrigerant in the refrigeration cycle in the liquid-receiving tank, and detecting the amount of recovered refrigerant (the height of the liquid surface of the refrigerant); rather, a very simple operation is carried out for merely determining whether ultrasonic waves can be transmitted and received to determine whether bubbles are being generated in the refrigerant circulating through the refrigeration cycle. Therefore, the device for detecting a refrigerant leak in a refrigeration cycle is not an inefficient device that stops operation of the individual parts of the refrigeration cycle or that allows leaks to be detected only at the timing of a periodic pumping down, but rather is innovative and of highly exceptional utility such that leaks can be detected at any time when the equipment is in operation.

BRIEF DESCRIPTION OF THE DRAWINGS

FIG. 2 is a schematic view of a usage state (in another example) of the present embodiment.

BEST MODE FOR CARRYING OUT THE INVENTION

Figure 1:
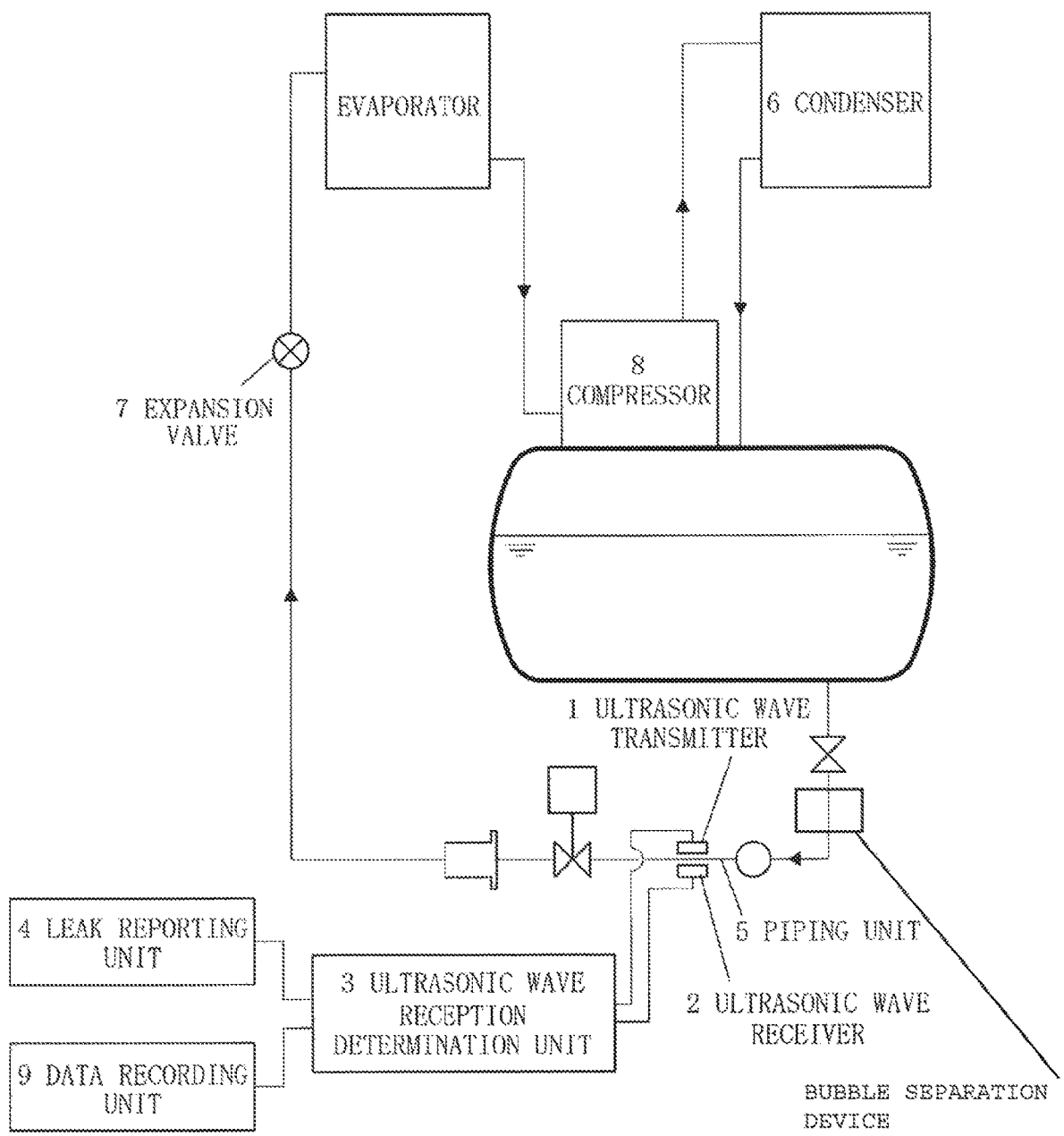
FIG. 1 is a schematic view of a usage state of the present embodiment.

Preferred embodiments of the present invention are briefly described below with reference to the diagrams while indicating the action of the present invention.

In the prior art, ultrasonic flow meters are used in order to measure the flow rate of refrigerant circulating through refrigeration cycles.

Ultrasonic flow meters are broadly classified as time transit flow meters and Doppler shift flow meters. In time transit flow meters, ultrasonic waves propagate through a refrigerant (fluid) within piping, the fluid speed of the circulating refrigerant is determined using the difference in propagation time when the ultrasonic waves propagate in both the upstream and downstream directions of the piping, and the flow rate is calculated from the piping cross-sectional area.

However, time transit ultrasonic flow meters present a drawback in that when bubbles are present in the path over which the ultrasonic waves propagate, propagation of the ultrasonic waves is blocked by the bubbles and measurement becomes impossible.

The inventors utilized the drawback that measurement by ultrasonic flow meters is made impossible due to bubbles to perfect the present invention.

Specifically, the refrigerant circulating within the refrigeration cycle is a liquid refrigerant (referred to as "liquefied refrigerant" below) obtained by having a gas compressed by a compressor 8 cooled in a condenser 6. The liquefied refrigerant is circulated through the refrigeration cycle in a completely condensed state (stable state), with no generation of bubbles. Therefore, when ultrasonic waves are transmitted or received between an ultrasonic wave transmitter 1 and an ultrasonic wave receiver 2 via the liquefied refrigerant in which no bubbles have been generated, propagation of the ultrasonic waves transmitted by the ultrasonic wave transmitter 1 will not be blocked partway therealong, and therefore the ultrasonic waves will propagate through the refrigerant and then be received by the ultrasonic wave receiver 2 without problem.

However, when a leak occurs in the refrigeration cycle, the quantity of refrigerant decreases, and bubbles (uncondensed gas) are generated within the condensed liquefied refrigerant. When ultrasonic waves are transmitted or received between the ultrasonic wave transmitter 1 and the ultrasonic wave receiver 2 via the liquefied refrigerant in which bubbles have been generated, propagation of the ultrasonic waves transmitted by the ultrasonic wave transmitter 1 will be blocked partway therealong, and therefore the ultrasonic waves will not be received by the ultrasonic wave receiver 2.

According to the present invention, ultrasonic waves are transmitted and received between an ultrasonic wave transmitter 1 and an ultrasonic wave receiver 2 via refrigerant (liquefied refrigerant) circulating through a refrigeration cycle, and it is determined whether a leak of refrigerant has occurred in the refrigeration cycle on the basis of whether the ultrasonic wave receiver 2 has received the ultrasonic waves transmitted by the ultrasonic wave transmitter 1.

Specifically, according to the present invention, in a state in which a refrigeration device or air conditioning device is operating and refrigerant is circulating through a refrigeration cycle; i.e., during normal operation, ultrasonic waves are transmitted and received between the ultrasonic wave transmitter 1 and the ultrasonic wave receiver 2, which are provided, in a state of mutual opposition, to a piping unit 5 through which the liquefied refrigerant circulates, and it is determined whether the ultrasonic waves are being transmitted and received normally; i.e., whether the ultrasonic wave receiver 2 has received the ultrasonic waves transmitted by the ultrasonic wave transmitter 1.

According to the present invention, an ultrasonic wave reception determination unit 3 determines whether the ultrasonic wave receiver 2 has received the ultrasonic waves transmitted by the ultrasonic wave transmitter 1, and a leak reporting unit 4 externally reports a leak event when the ultrasonic wave reception determination unit 3 has determined that the ultrasonic wave receiver 2 has not received the ultrasonic waves transmitted by the ultrasonic wave transmitter 1.

Thus, the present invention provides a device for detecting a refrigerant leak in a refrigeration cycle, the device having a very simple configuration, being capable of easily detecting the presence of a leak of refrigerant in a refrigeration cycle, and moreover being innovative and of exceptional utility so as to be capable of detecting leaks without stopping operation of the equipment and without reducing the equipment operation rate because the presence of leaks is determined when the equipment is in operation.

Examples

Specific examples of the present invention are described below with reference to the diagrams.

The present example provides a device for detecting a refrigerant leak in a refrigeration cycle, the device detecting the presence of a leak of refrigerant that circulates through a refrigeration cycle in a refrigeration device or air conditioning device, wherein the device for detecting a refrigerant leak in a refrigeration cycle comprises an ultrasonic wave transmitter 1 for transmitting ultrasonic waves having a prescribed frequency, an ultrasonic wave receiver 2 for receiving ultrasonic waves transmitted by the ultrasonic wave transmitter 1, an ultrasonic wave reception determination unit 3 for determining whether the ultrasonic wave receiver 2 has received the ultrasonic waves transmitted by the ultrasonic wave transmitter 1, and a leak reporting unit 4 for externally reporting a leak event when the ultrasonic wave reception determination unit 3 has determined that the ultrasonic wave receiver 2 has not received the ultrasonic waves transmitted by the ultrasonic wave transmitter 1; a configuration being adopted such that the ultrasonic wave transmitter 1 and the ultrasonic wave receiver 2 are provided, in a state of mutual opposition, to the outer surface of a piping unit 5 through which the refrigerant circulates, and such that in a state in which the refrigerant is circulating between the mutually opposed ultrasonic wave transmitter 1 and ultrasonic wave receiver 2, the ultrasonic waves are transmitted from the ultrasonic wave transmitter 1 toward the ultrasonic wave receiver 2, the ultrasonic wave reception determination unit 3 determines whether the ultrasonic wave receiver 2 has received the ultrasonic waves transmitted by the ultrasonic wave transmitter 1, and the leak reporting unit 4 externally reports a leak event when the ultrasonic wave reception determination unit 3 has determined that the ultrasonic wave receiver 2 has not received the ultrasonic waves transmitted by the ultrasonic wave transmitter 1.

The configuring elements of the present example are described in detail below.

Each of the ultrasonic wave transmitter 1 and the ultrasonic wave receiver 2 in the present example employs a clamp-on-type configuration, and these elements are provided, in a state of mutual opposition, to the surface of a piping unit 5 at a position in the refrigeration cycle downstream from a condenser 6 so as to sandwich the piping unit 5.

An air conditioner or other air conditioning device typically comprises both a cooling function and a heating function in a single machine, such that the direction in which a refrigerant circulates is switched by a four-way valve 10 provided within the refrigeration cycle to thereby switch between cooling and heating. In such a case, the positions at which the ultrasonic wave transmitter 1 and the ultrasonic wave receiver 2 are attached are different for when cooling is performed and when heating is performed. Therefore, the ultrasonic wave transmitter 1 and the ultrasonic wave receiver 2 may be configured to be provided at prescribed positions during cooling and during heating; specifically, during cooling, an outdoor unit functions as the condenser 6, and thus the ultrasonic wave transmitter 1 and the ultrasonic wave receiver 2 may be provided near the outlet of the outdoor unit, but during heating, an indoor unit functions as the condenser 6, and thus the ultrasonic wave transmitter 1 and the ultrasonic wave receiver 2 may be provided near the outlet of the indoor unit.

The ultrasonic wave transmitter 1 is configured such that the frequency of an oscillator is set to 3 MHz or less, and more specifically to 1 MHz or less (1 MHz in the present example). In the present example, a configuration was adopted in which generic, commercially available ultrasonic wave sensors (Kaijo Sonic Corp., model: SLT-12) were employed as the ultrasonic wave transmitter 1 and the ultrasonic wave receiver 2.

The ultrasonic wave reception determination unit 3 is connected to the ultrasonic wave transmitter 1 and the ultrasonic wave receiver 2. Upon receiving a signal from the ultrasonic wave transmitter 1 indicating that ultrasonic waves are being transmitted and receiving a signal from the ultrasonic wave receiver 2 indicating that the ultrasonic waves transmitted by the ultrasonic wave transmitter 1 have been received, the ultrasonic wave reception determination unit 3 determines that ultrasonic waves are being transmitted and received normally between the ultrasonic wave transmitter 1 and the ultrasonic wave receiver 2. When no signal can be received from the ultrasonic wave receiver 2 to indicate that the ultrasonic waves transmitted by the ultrasonic wave transmitter 1 have been received, irrespective of whether a signal is received from the ultrasonic wave transmitter 1 indicating that ultrasonic waves are being transmitted, the ultrasonic wave reception determination unit 3 determines that ultrasonic waves are not being transmitted and received normally between the ultrasonic wave transmitter 1 and the ultrasonic wave receiver 2. The ultrasonic wave reception determination unit 3 outputs a signal to the leak reporting unit 4 when it is determined that ultrasonic waves are not being transmitted and received normally between the ultrasonic wave transmitter 1 and the ultrasonic wave receiver 2.

At present, compressors 8 in refrigeration cycles often are inverter-controlled-type compressors. In refrigeration cycles configured in this manner, the flow of refrigerant circulating through the refrigeration cycle frequently changes, whereby bubbles are generated in the circulating refrigerant even when no leaks have occurred. However, in cases where the equipment is continuously operating for a long period of time; e.g., 24 hours, and as long as no leaks occur, then necessarily a state will be reached in which the refrigerant circulates stably and bubbles disappear, at which time the ultrasonic wave receiver 2 will be capable of receiving the ultrasonic waves. Therefore, a configuration may be adopted in which, e.g., in a state where the refrigeration device or air conditioning device has been continuously operating for at least a prescribed period of time, when the ultrasonic wave transmitter 1 has continued transmitting the ultrasonic waves within the prescribed period of time and the ultrasonic wave receiver 2 has not received any ultrasonic waves transmitted by the ultrasonic wave transmitter 1, the ultrasonic wave reception determination unit 3 determines that the ultrasonic wave receiver 2 has not received the ultrasonic waves transmitted by the ultrasonic wave transmitter 1 and outputs a signal to the leak reporting unit 4.

The leak reporting unit 4 is configured so as to be capable of issuing a visible or audible warning and creating awareness of a leak; specifically, the leak reporting unit 4 is configured so as to illuminate a lamp or display a message on a screen to create awareness of the occurrence of a leak, or activate an alarm, when a signal is received from the ultrasonic wave reception determination unit 3.

In the present example, a configuration is adopted in which when the ultrasonic wave reception determination unit 3 has determined that ultrasonic waves are not being transmitted and received normally between the ultrasonic wave transmitter 1 and the ultrasonic wave receiver 2, the ultrasonic wave reception determination unit 3 outputs a signal to the leak reporting unit 4. However, a configuration may be adopted in which, for example, when the ultrasonic wave reception determination unit 3 has determined that ultrasonic waves are being transmitted and received normally between the ultrasonic wave transmitter 1 and the ultrasonic wave receiver 2, the ultrasonic wave reception determination unit 3 outputs, to the leak reporting unit 4, an output signal different from that outputted when it is determined that ultrasonic waves are not being transmitted and received normally between the ultrasonic wave transmitter 1 and the ultrasonic wave receiver 2. Moreover, a configuration may be adopted in which the leak reporting unit 4 reports, in accordance with the type of signal transmitted from the ultrasonic wave reception determination unit 3, whether or not ultrasonic waves are being transmitted and received normally.

In the present example, there is also provided a data storage unit 9 for converting an output signal from the ultrasonic wave reception determination unit 3 or the leak reporting unit 4 into data and automatically storing the data.

Specifically, in the present example, a configuration is adopted in which a PC is used as the data recording unit 9, and data measured at periodic intervals is stored in the PC and managed in file format. Specifically, a configuration is adopted in which measurement data is stored in the data recording unit 9 and is, e.g., converted to numerical values or plotted on a graph so that the measurement data can be outputted (made visible), whereby the periodically acquired measurement data can be used as a record of simple and periodic inspections.

In the prior art, typically, when a mixed refrigerant containing HFCs or the like is used as the refrigerant in a refrigeration cycle, not only is it difficult to achieve complete liquification of the mixed refrigerant in the condenser 6, but in normal circumstances the mixed refrigerant circulates through the refrigeration cycle with many bubbles present therein due to being deliberately pumped to an expansion valve 7 as a freeze-prevention measure; therefore, bubbles will always make it impossible for ultrasonic waves to be transmitted and received normally between the ultrasonic wave transmitter 1 and the ultrasonic wave receiver 2, even if no leaks have occurred. Accordingly, in cases where a mixed refrigerant is used, a configuration may be adopted in which, e.g., a bubble separation device is provided at a position in the refrigeration cycle downstream from a condenser 6 and upstream from the ultrasonic wave receiver 2 (and the ultrasonic wave transmitter 1), the bubble separation device being configured to separate bubbles from the liquid in a normal state, and leave only bubbles generated when a leak occurs. Moreover, a configuration may be adopted in which, in the normal state, the liquefied refrigerant having no bubbles circulates between the ultrasonic wave transmitter 1 and the ultrasonic wave receiver 2, and when a leak has occurred, transmission and reception are prevented by the circulation of refrigerant in which bubbles are entrained.

The present invention is in no way limited to the present example. The specific configuration of the configuring elements can be designed as appropriate.

The invention claimed is:

1. A device for detecting the presence of a leak of refrigerant that is circulated through a refrigeration cycle, the device comprising:

an ultrasonic wave transmitter configured to transmit ultrasonic waves having a frequency of 3 MHz or less and at which propagation of the ultrasonic waves may be blocked by the presence of bubbles, which are generated within the refrigerant circulated through the refrigeration cycle when a leak is present in the refrigeration cycle, and which are not generated when a leak is not present in the refrigeration cycle, the ultrasonic wave transmitter being provided on an outer surface of a pipe by which a condenser and an expansion valve in the refrigeration cycle are connected, and the ultrasonic wave transmitter being provided at a position downstream from the condenser and upstream from the expansion valve; and an ultrasonic wave receiver disposed on the outer surface of the pipe at a position opposing the ultrasonic wave transmitter, the ultrasonic wave receiver configured to receive the ultrasonic waves transmitted by the ultrasonic wave transmitter;

the device being configured to:

receive a signal from the ultrasonic wave receiver indicating that the ultrasonic waves transmitted by the ultrasonic wave transmitter have been received, by way of the waves not being blocked by the bubbles which are generated when the leak is present in the refrigeration cycle, determine that transmission and reception of the ultrasonic waves transmitted between the ultrasonic wave transmitter and the ultrasonic wave receiver are not being carried out normally based on a first condition that the signal from the ultrasonic wave receiver, indicating that the ultrasonic waves transmitted by the ultrasonic wave transmitter has been received, has not been received, by way of the waves being blocked by the bubbles which are generated when the leak is present in the refrigeration cycle and output a leak indication signal indicating that the transmission and reception of the ultrasonic waves transmitted between the ultrasonic wave transmitter and the ultrasonic wave receiver are not being carried out normally when the controller determines that the transmission and reception of the ultrasonic waves transmitted between the ultrasonic wave transmitter and the ultrasonic wave receiver are not being carried out normally;

the device further comprising a display configured to receive the output leak indication signal, and display an indication indicating a presence of a leak event.

* * * * *